(12) United States Patent
Lau (10) Patent No.: US 7,417,961 B2
(45) Date of Patent: Aug. 26, 2008

(54) METHODS AND APPARATUS FOR IMPLEMENTING A SPEED SENSITIVE MOBILE ROUTER

(75) Inventor: Samuel Lau, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 819 days.

(21) Appl. No.: 10/732,788

(22) Filed: Dec. 9, 2003

(65) Prior Publication Data

US 2005/0124339 A1    Jun. 9, 2005

(51) Int. Cl.
*H04B 7/00* (2006.01)

(52) U.S. Cl. .................. 370/310; 370/351; 370/913; 455/433; 455/435.1; 455/441

(58) Field of Classification Search .............. 370/310, 370/328, 901, 908, 351, 395.52, 912, 913; 455/12.1, 414.1, 441, 456.1, 427, 432.1, 455/433, 435.1, 556.1, 556.2, 557, 344, 345, 455/346

See application file for complete search history.

(56) References Cited

U.S. PATENT DOCUMENTS

| 4,692,918 | A | 9/1987 | Elliott et al. |
|---|---|---|---|
| 5,016,244 | A | 5/1991 | Massey, Jr. et al. |
| 5,018,133 | A | 5/1991 | Tsukakoshi et al. |
| 5,218,600 | A | 6/1993 | Schenkyr et al. |
| 5,371,852 | A | 12/1994 | Attanasio et al. |
| 5,473,599 | A | 12/1995 | Li et al. |
| 5,572,528 | A | 11/1996 | Shuen |
| 5,572,582 | A | 11/1996 | Riddle |
| 5,619,552 | A | 4/1997 | Karppanen et al. |
| 5,729,537 | A | 3/1998 | Billstrom |
| 5,793,762 | A | 8/1998 | Penners et al. |
| 5,825,759 | A | 10/1998 | Liu |
| 5,862,345 | A | 1/1999 | Okanoue et al. |

(Continued)

FOREIGN PATENT DOCUMENTS

WO    WO 01/35585 A    5/2001

(Continued)

OTHER PUBLICATIONS

Anpalagan, Alagan S. et al: "Overlaid cellular system design with cell selection criteria for mobile wireless users" Electrical and Computer Engineering, 1999, IEEE Canadian Conference in Edmonton, Alberta, Canada May 9-12, 1999, Piscataway, NJ, USA, IEEE, US, vol. 1, May 9, 1999, ISBN: 0-7803-5579-2, pp. 24-28.

(Continued)

*Primary Examiner*—Quochien B Vuong
(74) *Attorney, Agent, or Firm*—Weaver Austin Villeneuve & Sampson LLP (57) ABSTRACT

Methods and apparatus are disclosed for implementing a speed sensitive mobile network device (e.g., Mobile Router). The speed of the mobile network device is detected. The values of one or more operating characteristics of one or more interfaces of the mobile network device are ascertained, where the values correspond to the speed of the mobile network device. One of the interfaces having a desired set of values of the operating characteristics at the speed of the mobile network device is then selected.

31 Claims, 7 Drawing Sheets

U.S. PATENT DOCUMENTS

| | | | |
|---|---|---|---|
| 6,078,575 | A | 6/2000 | Dommety et al. |
| 6,130,892 | A | 10/2000 | Short et al. |
| 6,195,705 | B1 | 2/2001 | Leung |
| 6,230,012 | B1 | 5/2001 | Willkie et al. |
| 6,339,830 | B1 | 1/2002 | See et al. |
| 6,393,482 | B1 | 5/2002 | Rai et al. |
| 6,407,988 | B1 | 6/2002 | Agraharam et al. |
| 6,434,134 | B1 | 8/2002 | La Porta et al. |
| 6,473,411 | B1 | 10/2002 | Kumaki et al. |
| 6,510,153 | B1 | 1/2003 | Inoue et al. |
| 6,512,754 | B2 | 1/2003 | Feder et al. |
| 6,515,974 | B1 | 2/2003 | Inoue et al. |
| 6,549,522 | B1 | 4/2003 | Flynn |
| 6,567,664 | B1 | 5/2003 | Bergenwall et al. |
| 6,571,289 | B1 | 5/2003 | Montenegro |
| 6,606,316 | B1 | 8/2003 | Albert et al. |
| 6,618,596 | B1 | 9/2003 | Uchida |
| 6,625,135 | B1 * | 9/2003 | Johnson et al. .......... 455/456.1 |
| 6,629,137 | B1 | 9/2003 | Wynn |
| 6,636,498 | B1 | 10/2003 | Leung |
| 6,731,621 | B1 | 5/2004 | Mizutani et al. |
| 6,738,362 | B1 | 5/2004 | Xu et al. |
| 6,747,961 | B1 | 6/2004 | Ahmed et al. |
| 6,766,168 | B1 | 7/2004 | Lim |
| 6,829,486 | B2 * | 12/2004 | McKenna et al. ........... 455/464 |
| 6,959,341 | B1 | 10/2005 | Leung |
| 7,151,758 | B2 * | 12/2006 | Kumaki et al. .............. 370/351 |
| 7,203,517 | B2 * | 4/2007 | Shimoda et al. .......... 455/456.1 |
| 2001/0032262 | A1 | 10/2001 | Sundqvist et al. |
| 2002/0075878 | A1 | 6/2002 | Lee et al. |
| 2002/0186693 | A1 | 12/2002 | Inoue et al. |
| 2003/0076852 | A1 | 4/2003 | Fukui |
| 2003/0117965 | A1 | 6/2003 | Markki et al. |

FOREIGN PATENT DOCUMENTS

| | | |
|---|---|---|
| WO | 03/043226 | 5/2003 |

OTHER PUBLICATIONS

Cisco Technology Inc., PCT/US2004/034785, "International Search Report" mailed Jan. 20, 2005.

Cisco Technology Inc., PCT/US2004/034785, "Written Opinion of the International Searching Authority" mailed Jan. 20, 2005.

T. Li, B. Cole, P. Morton, and D. Li, *"Cisco Hot Standby Router Protocol (HSRP),"* Mar. 1998, Network Working Group RFC 2281 (http://ftp.ietf.org/rfc/rfc2281.txt?number=2281).

Release notes for 3Com Corporation, "Conducting a Redundant Route for Network Resiliency", Mar. 1994, *NET Builder Family Bridge/Router*, pp. 26-29.

"Mobile IP", Release 12.0(1)T, pp. 1-55.

Uyless Black, *"TCP/IP and Related Protocols"*, 1992, McGraw-Hill, Inc., pp. 226-249.

Chambless, et al., *"Home Agent Redundancy Protocol (HARP)"*, Internet-Draft, Oct. 27, 1997.

C. Perkins, Ed., Networking Working Group, RFC 2002 *"IP Mobility Support"*, Oct. 1996.

G. Montenegro, *"Reverse Tunneling for Mobile IP,"* RFC 2344, Sun Microsystems, Inc., pp. 1-19, May 1998.

D. Harkins and D. Carrel, *"The Internet Key Exchange (IKE),"* Internet-Draft, Cisco Systems, pp. 1-33, Jun. 1998.

D. Cong and M. Hamlen, and C. Perkins, *"The Definitions of Managed Objects for IP Mobility Support using SMIv2,"* RFC 2006, Motorola and IBM, pp. 1-52, Oct. 1996.

J. Moy, *"OSPF Version 2"*, RFC 1247, Jul. 19, 1991.

D. Oran, "OSI IS-IS Intra-domain Routing Protocol", RFC 1142, Feb. 1990.

C. Finseth, *"An Access Control Protocol, Sometimes Called TACACS,"* RFC1492, pp. 1-15, Sep. 13, 1992.

D. Carrel and Lol Grant, "The *TACACS+ Protocol,"* Network Working Group, Internet-Draft, Cisco Systems, pp. 1-42, Jan. 1997.

C. Rigney, *"RADIUS Accounting,"* RFC 2139, Livingston, pp. 1-25, Apr. 1997.

C. Rigney, et al., *"Remote Authentication Dial in User Service (RADIUS),"* RFC 2138, pp. 1-65 Apr. 1997.

Examiner's Communication pursuant to Article 96(2) EPC dated Oct. 25, 2006, from corresponding European Patent Application No. 04 795 886.3, 4 pp. (CISCP358EP).

Examiner's Communication pursuant to Article 96(2) EPC dated Aug. 1, 2007, from corresponding European Patent Application No. 04 795 886.3, (CISCP358EP).

* cited by examiner

Mobile Router Profile

| Interface 1 | Interface 1 | Interface 2 | Interface 2 | ...Interface n |
|---|---|---|---|---|
| Speed = 0 | Speed = 1 | Speed = 0 | Speed = 1 | |
| Bandwidth0 | Bandwidth1 | Bandwidth0 | Bandwidth1 | |
| QoS method0 | QoS method1 | QoS method0 | QoS method1 | |
| % Bandwidth for voice traffic0 | % Bandwidth for voice traffic1 | % Bandwidth for voice traffic0 | % Bandwidth for voice traffic1 | |

METHODS AND APPARATUS FOR IMPLEMENTING A SPEED SENSITIVE MOBILE ROUTER

BACKGROUND OF THE INVENTION

1. Field of the Invention

The present invention relates to Mobile IP network technology. More particularly, the present invention relates to implementing a speed sensitive Mobile IP mobile router.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

Figure 1:
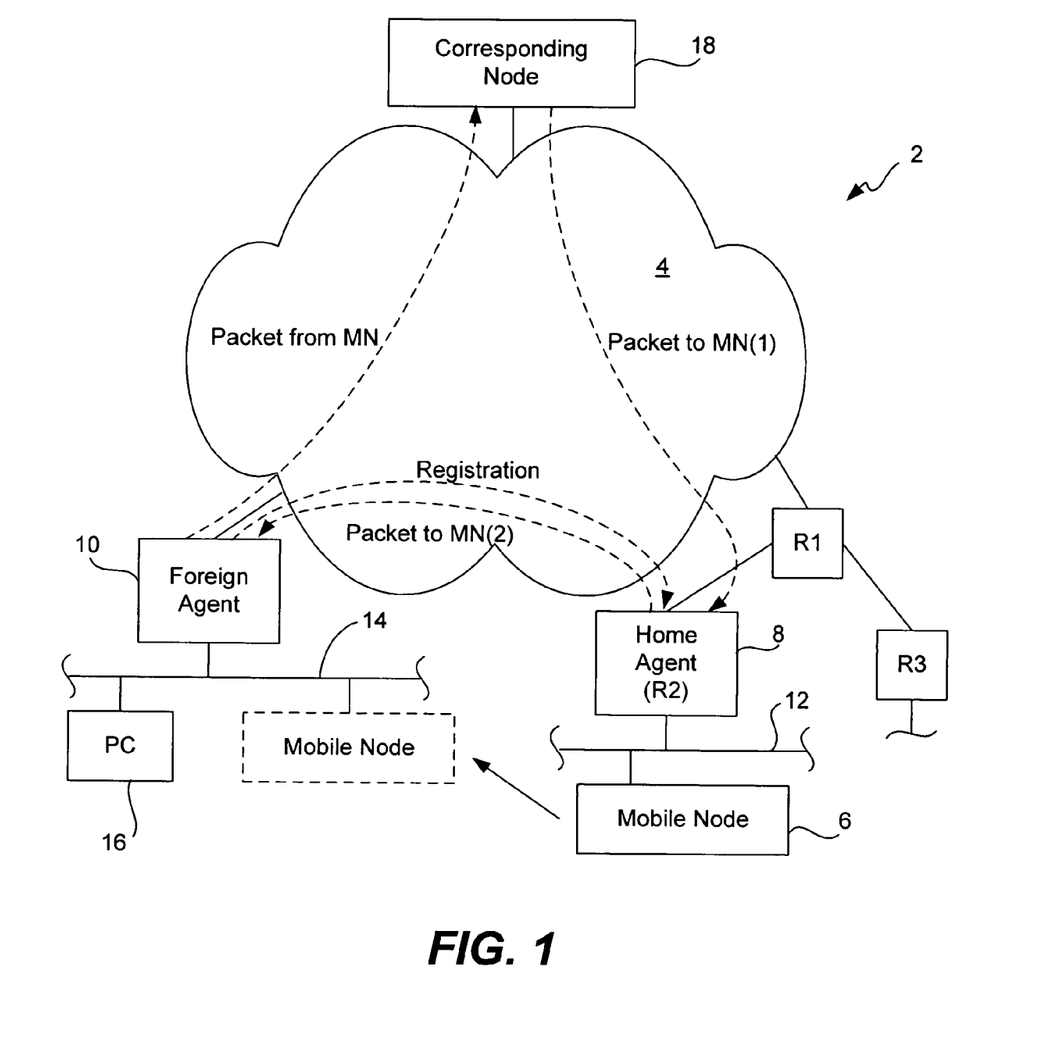
FIG. 1 is a diagram of a Mobile IP network segment and associated environment.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. A message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

In addition to providing connectivity to a mobile node, it may be desirable to provide for the mobility of one or more networks moving together, such as on an airplane or a ship. RFC 2002 section 4.5 discusses the possibility of implementing Mobile Routers.

In one approach suggested in RFC 2002 section 4.5, a Home Agent is configured to have a permanent registration for each fixed node. For instance, a Mobile Router may support multiple nodes. In order to receive communication from a corresponding node, messages must be routed to the appropriate node. When the Mobile Router roams to a first Foreign Agent, it registers with its Home Agent so that it may receive packets from a corresponding node. When the Mobile Router subsequently roams to a second Foreign Agent, it again registers with its Home Agent. In this manner, a device that has connected to the Mobile Router may communicate via the Internet by connecting to a network of the Mobile Router.

An airplane is an exemplary scenario in which a Mobile Router may be implemented. For instance, each plane may have a Mobile Router (and therefore many networks) on board to provide Internet connectivity and services. A Mobile Router may also be useful in other types of vehicles.

Generally, a mobile network device such as Mobile Node or a Mobile Router selects an interface port to perform roaming. In today's Mobile Router, assuming that an interface link is up or available, the interface port is selected based upon values that are predefined in the interface ports that indicate various operating characteristics of the interface ports. Generally, these predefined values include the interface priority and the bandwidth of the interface. Thus, these values are statically configured to reflect performance when the mobile network device is stationary. However, these values are no longer accurate as the Mobile Router's traveling speed increases in a wireless network such as a 3G high-speed wireless network.

In view of the above, it would be desirable if the operation of a mobile network device such as a Mobile Router were sensitive to the speed of the mobile network device.

SUMMARY OF THE INVENTION

Methods and apparatus are disclosed that enable a mobile network device such as a Mobile Router to operate with speed sensitivity. This is accomplished, in part, through the identification of values of operating characteristics of interfaces of the mobile network device at various speeds or ranges of speeds. From these values, the operating characteristics associated with an interface at a particular speed may be identified. This enables an interface to be dynamically selected corresponding to the speed of the mobile network device.

In accordance with one aspect of the invention, a mobile network device is operated such that a speed of the mobile network device is detected. One or more values of one or more operating characteristics of an interface of the mobile network device are then ascertained at the speed of the mobile network device. For instance, these values may be ascertained from a profile indicating the operating characteristic values for one or more interfaces of the mobile network device at various operating speeds or ranges of operating speeds. The values of the operating characteristics are then applied to the interface of the mobile network device, thereby enabling the appropriate interface to be selected as well as configured.

In accordance with another aspect of the invention, a speed of the mobile network device is detected. One or more values of one or more operating characteristics of one or more interfaces of the mobile network device are ascertained, where the one or more values correspond to the speed of the mobile network device. One of the interfaces having a desired set of values of the operating characteristics at the speed of the mobile network device is then selected.

The operating characteristics may include, for example, the bandwidth, quality of service method and/or amount (e.g., percentage) of the bandwidth allocated to one or more types of traffic. For instance, the types of traffic to which bandwidth is to be allocated may include video and/or voice traffic.

In accordance with one embodiment of the invention, the mobile network device is configured with a profile that indicates the operating characteristic values for one or more interfaces of the mobile network device at various operating speeds or ranges of operating speeds. Specifically, the operating characteristic values for as particular interface may correspond to the operating characteristic values of a device (e.g., wireless device) to which the interface is connected. From this information, the correct operating characteristic values may be identified for an interface at any traveling speed of the mobile network device, thereby enabling an optimum interface to be selected. In this manner, the performance of a mobile network device may be optimized at any speed.

The embodiments of the invention may be implemented software, hardware, or a combination of hardware and software. The invention can also be embodied as computer readable code on a computer readable medium. In addition, data structures disclosed are also part of the invention.

DETAILED DESCRIPTION OF THE INVENTION

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 2A:
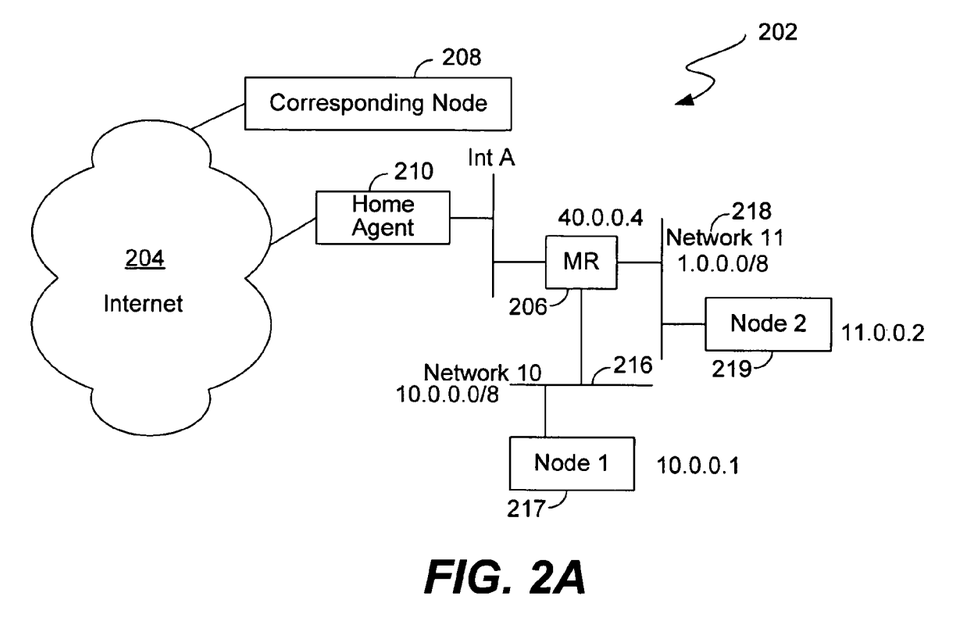
FIG. 2A is a diagram illustrating a Mobile IP mobile router and associated environment in which the mobile router is stationed at the Home Agent.
Figure 2B:
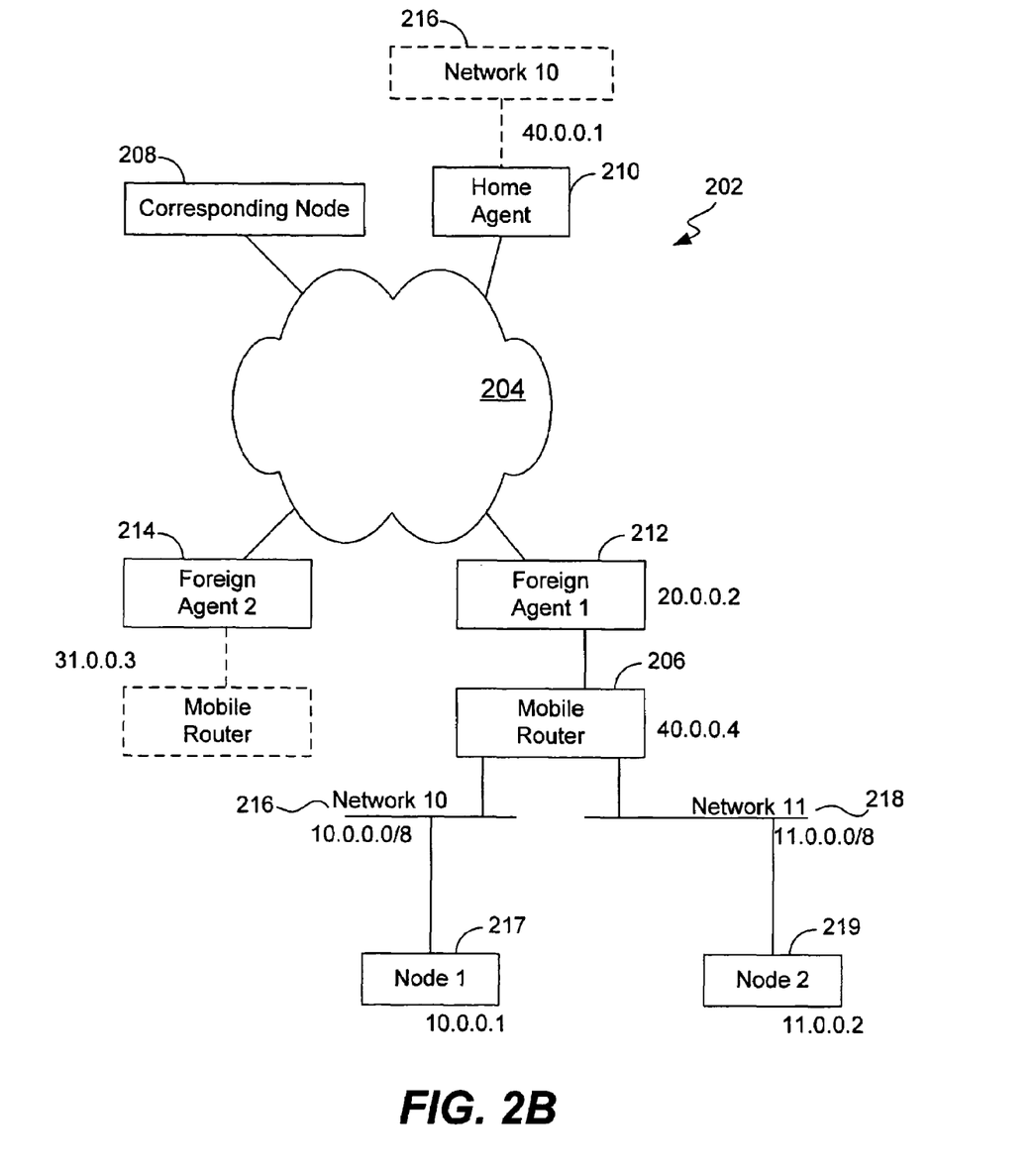
FIG. 2B is a diagram illustrating a Mobile IP mobile router and associated environment when the mobile router is roaming.

Embodiments of the invention support implementation of a speed sensitive mobile network device such as a Mobile Router. FIGS. 2A and 2B describe the general operation of a Mobile Router when stationed at its Home Agent and when roaming, respectively.

FIG. 2A is a diagram illustrating a Mobile IP Mobile Router and associated environment in which the Mobile Router is stationed at the Home Agent. As shown, a Mobile IP environment 202 includes the internet (or a WAN) 204 over which a node such as "node 1" 217 connected to Mobile Router 206 can communicate remotely with a corresponding node 208 via mediation by a Home Agent 210 and a Foreign Agent. By way of example, the Home Agent 210 and the Foreign Agent may be network devices such as routers or hosts having Mobile IP capabilities. The Mobile Router 206 may provide connectivity to multiple networks, many or all of which may roam with mobile router 206. As shown, the mobile router 206 provides connectivity to a first mobile network, "network 10" 216, and a second network, "network 11" 218. Although only one network, "network 10" 216, in this example, is mobile, other networks such as the second network, "network 11" 218, may be mobile networks.

Each network and network device is assigned a unique IP address. IP addresses typically include a network-prefix portion and a host portion. By way of example, the network-prefix may consist of the leftmost 8 bits and the host portion may consist of the rightmost 24 bits. Exemplary IP addresses are provided, as shown. The Home Agent 210 has an IP address 40.0.0.1, the mobile router has an IP address 40.0.0.4, the first network 216 has an IP address 10.0.0.0/8 and the second network has an IP address 11.0.0.0/8. A 32-bit mask may be used to specify the entire IP address (e.g., 40.0.0.4/

32). Alternatively, a mask may be used to exclude the rightmost 24 bits of the network addresses that are associated with the Mobile Router supported networks, as shown. In this manner, the network portion of the IP addresses may be used in routing decisions to route packets to nodes 217 and 219, identified by IP addresses 10.0.0.1 and 11.0.0.2, respectively.

FIG. 2B is a diagram illustrating a Mobile IP Mobile Router and associated environment when the Mobile Router is roaming. As shown, the Mobile Router may be linked to a first available Foreign Agent 212. As the Mobile Router roams, it may then communicate through a second available Foreign Agent 214 at another geographical location. As described above, the Mobile Router 206 may provide connectivity to multiple networks, many or all of which may roam with Mobile Router 206. Although only one network, "network 10" 216, is shown to be mobile, other networks may be mobile networks. Exemplary IP addresses are provided, as shown. The Home Agent 210 has an IP address 40.0.0.1, the first Foreign Agent 212 has an IP address 20.0.0.2, the second Foreign Agent 214 has an IP address 31.0.0.3, the mobile router has an IP address 40.0.0.4, the first network 216 has an IP address 10.0.0.0/8 and the second network has an IP address 11.0.0.0/8.

In order to provide for connectivity to multiple networks, the Home Agent may have a mobility binding table, a routing table, and a mobile router/network mapping table available for its use. The mapping table may be used to associate the Mobile Router with one or more networks. Since the networks associated with the Mobile Router are typically configured at the time that the Mobile Router is connected to the Home Agent, the mapping table may be static during registration of the Mobile Router. The routing table and the mobility binding table may then be used to associate a care-of address with the Mobile Router and the networks. Specifically, the routing table associates each one of the networks with a care-of address through a tunnel interface to the Mobile Router. Similarly, the mobility binding table associates the Mobile Router with the care-of address.

International Mobile Telecommunications-2000 (IMT-2000) is the global standard for third generation (3G) wireless communications. IMT-2000 provides a framework for worldwide wireless access by linking the diverse systems of terrestrial and/or satellite based networks. It will exploit the potential synergy between digital mobile telecommunications technologies and systems for fixed and mobile wireless access systems.

The 3G high-speed wireless network technology defined by IMT-2000 supports different bandwidth connections depending on the traveling speed of the Mobile Router, as well as high speed and high bandwidth services. Technology such as 3G technology also specifies that the Quality of Service (QoS) depends upon the bandwidth (e.g., uplink bandwidth) value. Specifically, the data bandwidth allocation such as that allocated to voice traffic depends upon the bandwidth value. However, the operating characteristics (e.g., bandwidth) of the interfaces of the Mobile Router are typically fixed. Specifically, the bandwidth value is typically predefined in the interface ports of the Mobile Router. Since the Mobile IP roaming interface port is selected based upon the bandwidth of the interface port (if the interface priority values are equal) or other statically configured values, it is generally not possible to optimize the performance of the interfaces at variable speed connections.

The wireless 3G uplink bandwidth will vary depending upon the motion speed. 3G uplink bandwidth is described in IMT-2000 as having a mobile environment bandwidth in which the stationary bandwidth is a minimum of 2048 kbps, a pedestrian bandwidth is a minimum of 384 kbps, and a vehicular bandwidth is a minimum of 144 kbps. Thus, as the speed increases, the bandwidth decreases.

To illustrate the optimization problem, consider the situation in which a Mobile Router has two interfaces connecting to two different wireless Wireless Access Network (WAN) devices, which each have different performance characteristics at different traveling speeds. For example, General Packet Radio Service (GPRS) may deliver better uplink performance than Code Division Multiple Access (CDMA) in fast motion. Typically, the Mobile Router cannot sense the change in bandwidth as the speed of the Mobile Router changes.

Typically, the bandwidth values are statically configured for each of the interfaces. As one example, Interface A defines a static bandwidth value equal to 1500 kbps (e.g., to approximate the bandwidth when the Mobile Router is stationary) and interface C defines a static bandwidth value equal to 400 kbps (e.g., to approximate the bandwidth when the Mobile Router is in fast motion). If the Mobile Router is in fast motion, its actual uplink bandwidth at interface A may only reach 144 kbps. However, the Mobile Router cannot detect the traveling speed, and therefore cannot detect the change in bandwidth from the bandwidth that has been statically configured. Thus, if the Mobile Router has another available uplink interface, interface C, which provides a 400 kbps uplink bandwidth, the Mobile Router will not switch to the faster interface C, since Mobile IP has no knowledge of the mobile condition and therefore selects the highest bandwidth interface instead. However, in reality, interface C should be the correct interface port to choose.

As another example, consider a Mobile Access Router having 2 interfaces connecting to different wireless WAN devices. In this example, Interface B defines a static bandwidth value equal to 384 kbps and interface C defines a static bandwidth value equal to 400 kbps, which approximate bandwidth values of the respective interfaces when the user is traveling at a slow walking speed. If the Mobile Router is stationary, interface B's actual bandwidth is 1500 kbps, while C's actual bandwidth is 1400 kbps. Unfortunately, since the bandwidth values are statically defined for each interface and the Mobile Router cannot detect the change in bandwidth from the statically configured values or the actual bandwidth values, the performance of the Mobile Router cannot be optimized. Thus, in this example, the Mobile Router will not choose interface B, since the statically configured interface bandwidth of B is not the highest available.

In addition, the Quality of Service may allocate a specific percentage of the uplink bandwidth to certain traffic. However, since the bandwidth changes with the Mobile Router's speed, the percentage of the bandwidth allocated to the uplink bandwidth of this traffic will vary. For instance, in order to allocate 64 kbps for Voice over IP (VoIP) traffic, the percentage of the total bandwidth will vary with the uplink bandwidth. For instance, if the uplink bandwidth is 2048 kbps, 3% of the total bandwidth is sufficient. If the uplink bandwidth is 384 kbps, 16% of the total bandwidth is needed. Similarly, if the uplink bandwidth is 144 kbps, 44% of the total bandwidth is needed.

In accordance with one aspect of the invention, a mobile network device such as a Mobile Router may be operated such that it is sensitive to the speed of the mobile network device. Specifically, a speed of the mobile network device is detected through the use of a Global Positioning System (GPS) or other mechanism. The GPS may be embedded, for example, in a vehicle in which the Mobile Router is functioning. One or more values of one or more operating characteristics (e.g., bandwidth or quality of service) of one or more interfaces of the mobile network device are then ascertained, wherein the values correspond to the speed of the mobile network device. One of the interfaces having a desired set of values of the operating characteristics at the speed of the mobile network device is then selected.

Figure 3:
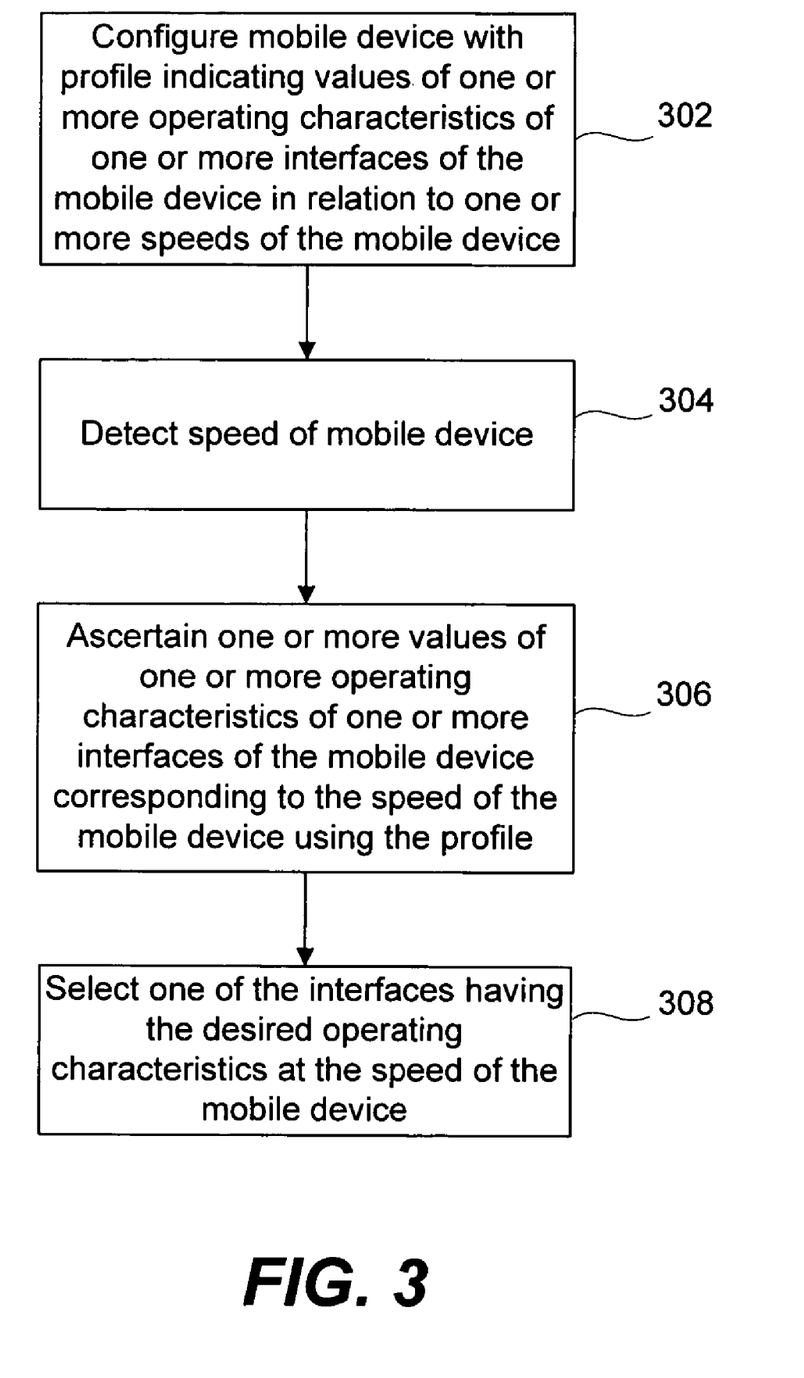
FIG. 3 is a process flow diagram illustrating a method of selecting an interface of a mobile network device in accordance with one aspect of the invention.

FIG. 3 is a process flow diagram illustrating a method of selecting an interface of a mobile network device in accordance with one aspect of the invention. As shown at block 302, the mobile network device is configured with a profile indicating values of one or more operating characteristics of one or more interfaces of the mobile network device in relation to one or more speeds of the mobile device. The speed of the mobile network device is detected at block 304. For instance, a mobile network device such as a Mobile Router may be implemented in a vehicle, such as a plane, boat, or automobile. Thus, a GPS device may be used to detect the speed of the vehicle in which the mobile network device is implemented. One or more values of one or more operating characteristics of one or more interfaces of the mobile device corresponding to the speed of the mobile device are then ascertained at block 306 using the profile associated with the mobile network device. One of the interfaces of the mobile network device having the desired operating characteristics at the speed of the mobile device is then selected at block 308.

Once the interface of the mobile network device has been selected, the mobile network device may register with a Home Agent via the selected interface. The mobile network device may then transmit and receive packets via the selected interface.

As described above, various operating characteristics may be used, individually or in combination, to select the appropriate interface of the mobile network device. These operating characteristics include, but are not limited to, bandwidth, quality of service method, and amount (e.g., percentage or fraction) of the bandwidth to be allocated to one or more types of traffic. Exemplary quality of service methods include priority queueing and custom queueing. The types of traffic may include, but are not limited to, voice or video traffic.

Figure 4:
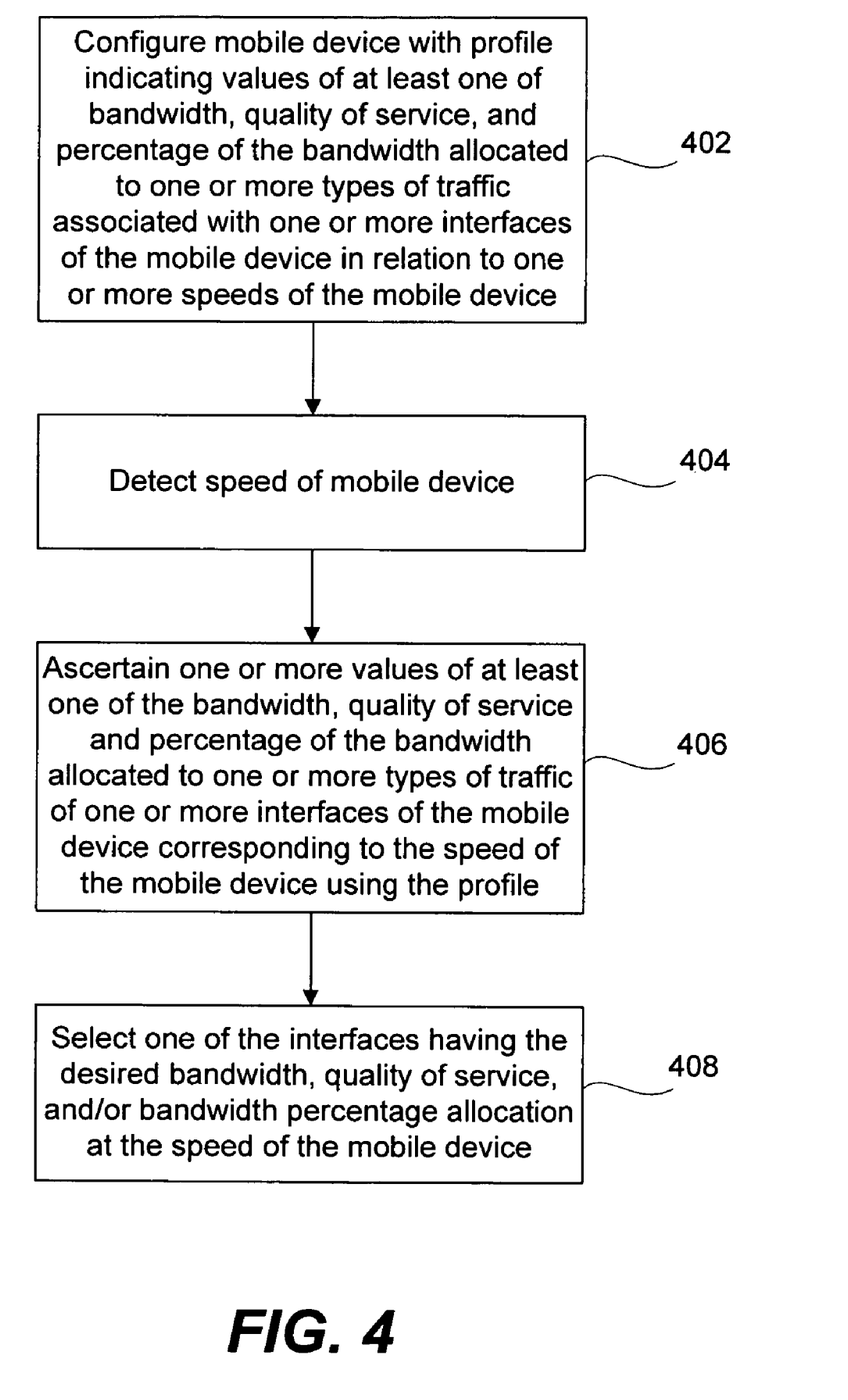
FIG. 4 is a process flow diagram illustrating a method of selecting an interface of a Mobile Router in accordance with one embodiment of the invention.

FIG. 4 is a process flow diagram illustrating a method of selecting an interface of a Mobile Router in accordance with one embodiment of the invention. The Mobile Router is configured at block 402 with a profile indicating values of at least one of bandwidth, quality of service, and percentage of the bandwidth allocated to one or more types of traffic, where the values are provided for one or more interfaces of the Mobile Router in relation to one or more speeds of the Mobile Router. An exemplary profile will be described in further detail below with reference to FIG. 5. The speed of the Mobile Router is detected at block 404. One or more values of at least one of the bandwidth, quality of service method and amount (e.g., percentage) of the bandwidth allocated to one or more types of traffic for one or more interfaces of the Mobile Router corresponding to the speed of the Mobile Router are ascertained at block 406 using the profile. One of the interfaces having the desired bandwidth, quality of service, and/or bandwidth percentage allocation at the speed of the mobile device is then selected at block 408.

As described above, the values of one or more operating characteristics of one or more interfaces of the mobile network device are configured at the mobile network device. These operating characteristics may include, for example, bandwidth, quality of service, and/or percentage of the bandwidth allocated to one or more types of traffic. Moreover, these values are specified at one or more speeds at which the mobile network device is capable of operating. These values may be stored in a variety of formats, as well as a variety of data structures. For instance, these values may be stored in a table format. Moreover, these values may be stored in a single data structure as well as multiple data structures.

Figure 5:
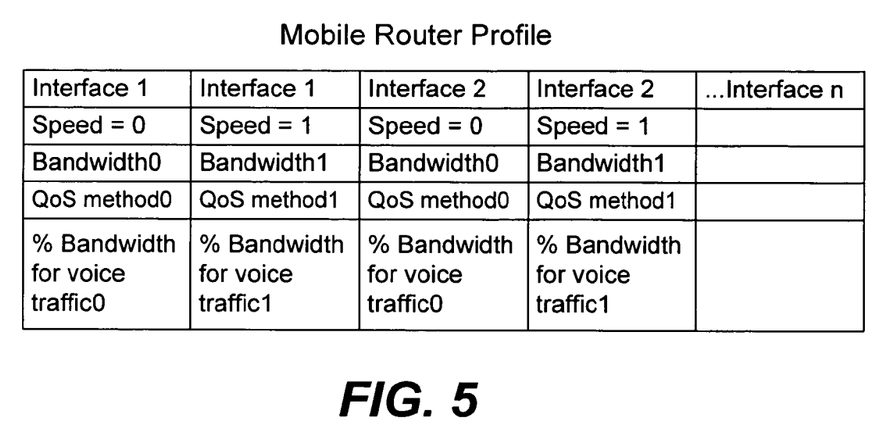
FIG. 5 is a diagram illustrating an exemplary profile associated with a Mobile Router in accordance with one embodiment of the invention.

In accordance with one embodiment, the values of one or more operating characteristics of one or more interfaces of the mobile network device at one or more speeds at which the mobile network device is capable of operating are ascertained from one or more profiles. FIG. 5 is a diagram illustrating an exemplary profile associated with a Mobile Router in accordance with one embodiment of the invention. The profile indicates values of one or more operating characteristics of one or more interfaces of the mobile network device at one or more speeds at which the mobile network device is capable of operating. Specifically, the speeds include a first speed at which the mobile network device is non-mobile and one or more additional speeds at which the mobile network device is capable of operating while traveling. Specifically, the profile includes one or more values of the one or more operating characteristics of the one or more interfaces of the mobile network device at a plurality of sets of speeds, where each of the sets of speeds includes one or more speeds at which the mobile network device is capable of operating.

As shown, the profile represents the actual (or approximate) operating characteristics of each of the interfaces of the Mobile Router at various speeds or ranges of speeds. Specifically, for each interface, the bandwidth, quality of service method, and percentage of the bandwidth allocated to voice traffic are specified for a particular speed or range of speeds. When the operating speed is identified, the interface having the most desirable operating characteristics at that speed may be identified and selected. Through selection of a particular interface, the set of values of the operating characteristics are effectively applied to the selected interface of the mobile network device. Accordingly, the information stored in such a profile may be used to select the optimum interface at a specific speed or range of speeds.

As one example, a profile may indicate that when the Mobile Router is stationary (e.g., when the speed is approximately equal to zero mph or between approximately zero mph and approximately 1 mph), the bandwidth of one or more interfaces is 2048 kbps, while the QoS assigns 1% of the total bandwidth to voice traffic (e.g., G711 voice traffic). Similarly, the same or a different profile may include operating characteristic values that are applicable at a pedestrian speed. For instance, a pedestrian speed may be between approximately 1 mph and 3 mph. At the pedestrian speed, the interface or set of interfaces have a bandwidth of 384 kbps, while the QoS assigns 10% of the total bandwidth to voice traffic. The same or a different profile may further specify operating characteristic values that are applicable at a vehicular speed. The vehicular speed may, for example, be greater than 3 mph. At the vehicular speed, the bandwidth of the interface or set of interfaces is 144 kbps, while the QoS assigns 40% of the total bandwidth to voice traffic. Thus, based upon the speed information obtained from a GPS or other mechanism, the Mobile Router can identify the operating characteristics of the interfaces by applying the profile(s) to the interfaces. Accordingly, through assigning a more accurate bandwidth value to the interfaces of a mobile network device such as a Mobile Router, the optimum roaming interface may be selected.

The profile may be configured by a user. In addition, the values may be modified periodically, as appropriate, to more accurately indicate the values of the operating characteristics of the interfaces of the mobile network device that are present at a given speed of the mobile network device. In accordance with one embodiment, the values of the one or more operating characteristics of the one or more interfaces correspond to values of the one or more operating characteristics of one or more devices (e.g., wireless devices such as Access Points) to which the interfaces are to connect. Specifically, the values of the one or more operating characteristics of one of the interfaces corresponds to values of the one or more operating characteristics of a device to which the interface is to connect or connected to. Thus, the profile may be updated or configured to correlate with the device(s) to which the mobile network device is to be connected.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (mobile network device) of this invention may be specially constructed for the required purposes, or may be a general purpose programmable machine selectively activated or reconfigured by a computer program stored in memory. The processes presented herein are not inherently related to any particular router or other apparatus. In a preferred embodiment, the mobile network device of this invention may be specially configured routers such as specially configured router models 2500, 2600, 3200, 3600, 4000, 4500, 4700, 7200, and 7500 available from Cisco Systems, Inc. of San Jose, Calif. A general structure for some of these machines will appear from the description given below.

Generally, the registration technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid registration system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the registration systems of this invention may be specially configured routers such as specially configured router models 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Figure 6:
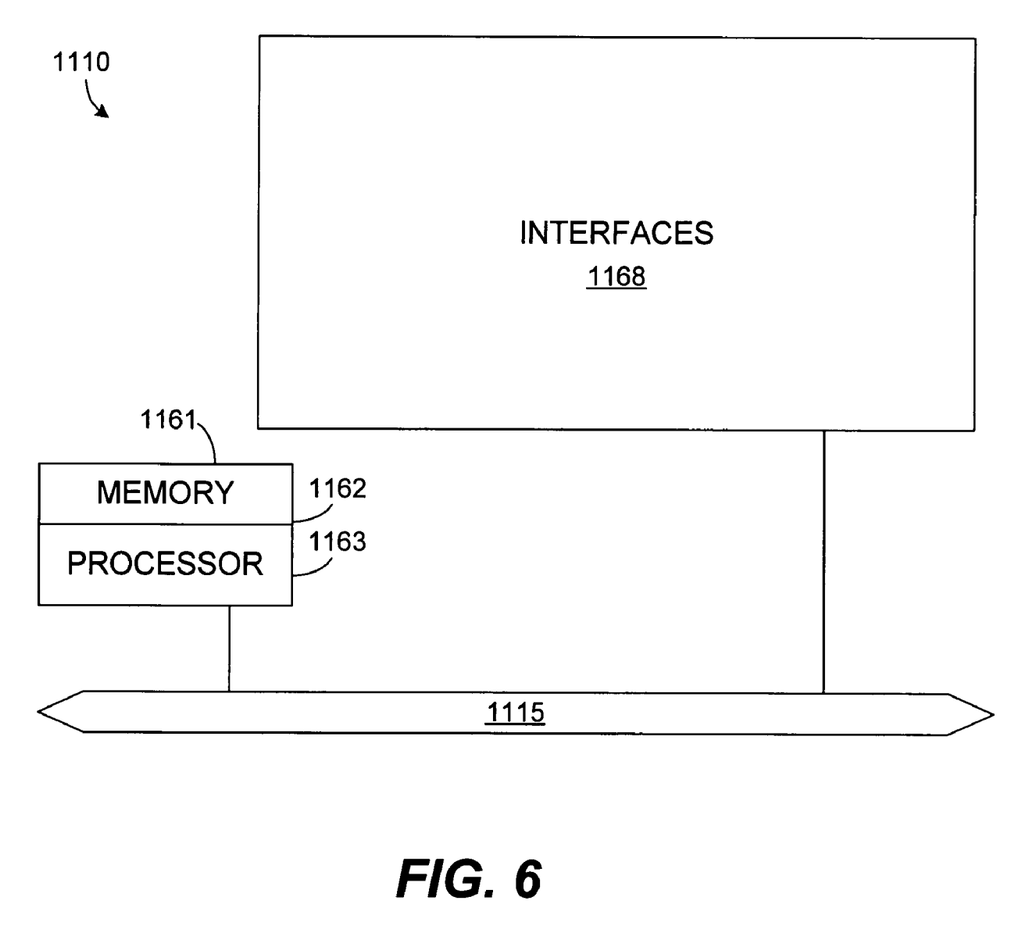
FIG. 6 is a block diagram of a network device that may be configured to implement aspects of the present invention.

Referring now to FIG. 6, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for registration and routing functions described herein. The program instructions may control the operation of an operating system and/or one or more applications, for example. The memory or memories may also be configured to store tables such as mobility binding and registration tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to nodes on remote network segments can be used as well. For example, bridges or other less intelligent packet switches may also employ the standby protocol of this invention. In addition, although the present invention is described with reference to Mobile Routers, the embodiments disclosed may be equally applicable to other mobile network devices such as Mobile Nodes. In addition, although 3G WAN technology has been referenced, these examples are merely illustrative, and therefore the embodiments described herein should not be limited to 3G WAN technology. Accordingly, the present embodiments are to be considered as illustrative and not restrictive, and the invention is not to be limited to the details given herein, but may be modified within the scope and equivalents of the appended claims.

What is claimed is:

1. A method of operating a mobile network device, comprising:
   detecting a speed of the mobile network device;
   ascertaining one or more values of one or more operating characteristics of each of two or more interfaces of the mobile network device, the one or more values of the one or more operating characteristics of each of the two or more interfaces corresponding to the speed of the mobile network device; and
   selecting one of the two or more interfaces using the values of the one or more operating characteristics of each of the two or more interfaces at the speed of the mobile network device, the selected one of the two or more interfaces having a desired set of values of the operating characteristics at the speed of the mobile network device.

2. The method as recited in claim 1, further comprising: applying the set of values of the operating characteristics to the selected interface of the mobile network device.

3. The method as recited in claim 1, further comprising: registering with a Home Agent via the selected interface.

4. The method as recited in claim 3, further comprising: transmitting one or more packets via the selected interface.

5. The method as recited in claim 3, further comprising: receiving one or more packets from the Home Agent via the selected interface.

6. The method as recited in claim 1, further comprising: transmitting one or more packets via the selected interface.

7. The method as recited in claim 1, further comprising: receiving one or more packets from a Home Agent via the selected interface.

8. The method as recited in claim 1, wherein detecting a speed of the mobile network device is performed by a GPS.

9. The method as recited in claim 1, wherein the mobile network device is a Mobile Router.

10. The method as recited in claim 1, wherein the operating characteristics include at least one of bandwidth, quality of service, or percentage or fraction of the bandwidth allocated to one or more types of traffic.

11. The method as recited in claim 10, wherein the one or more types of traffic include voice traffic.

12. The method as recited in claim 1, wherein ascertaining one or more values of one or more operating characteristics of two or more interfaces of the mobile network device comprises:
   ascertaining the values of one or more operating characteristics of a single one of the two or more interfaces from a profile, the profile indicating one or more values of the one or more operating characteristics of each of the two or more interfaces of the mobile network device at one or more speeds at which the mobile network device is capable of operating.

13. The method as recited in claim 12, wherein the values of the one or more operating characteristics of the single one of the two or more interfaces correspond to values of the one or more operating characteristics of one or more devices to which the interface is to connect.

14. The method as recited in claim 13, wherein the devices are wireless devices.

15. The method as recited in claim 12, wherein the values of the one or more operating characteristics of each of the two or more interfaces corresponds to values of the one or more operating characteristics of a device to which the corresponding interface is to connect.

16. The method as recited in claim 15, wherein the device is a wireless device.

17. The method as recited in claim 16, wherein the device is an Access Point.

18. The method as recited in claim 12, wherein the one or more speeds include a first speed at which the mobile network device is non-mobile and one or more additional speeds at which the mobile network device is capable of operating while traveling.

19. The method as recited in claim 12, wherein the one or more operating characteristics include at least one of bandwidth, quality of service, or percentage or fraction of the bandwidth allocated to one or more types of traffic.

20. The method as recited in claim 19, wherein the one or more types of traffic include at least one of voice traffic or video traffic.

21. The method as recited in claim 12, wherein the profile includes one or more values of the one or more operating characteristics of each of the two or more interfaces of the mobile network device at a plurality of sets of speeds, each of the sets of speeds including one or more speeds at which the mobile network device is capable of operating.

22. The method as recited in claim 21, wherein one of the plurality of sets of speeds includes a first set at which the mobile network device is non-mobile and one or more additional sets at which the mobile network device is capable of operating while traveling.

23. The method as recited in claim 12, further comprising: configuring the mobile network device with the profile, the profile indicating one or more values of the one or more operating characteristics of each of the two or more interfaces of the mobile network device in relation to one or more speeds at which the mobile network device is capable of operating.

24. The method as recited in claim 23, wherein the one or more speeds includes a first speed at which the mobile network device is non-mobile and one or more additional speeds at which the mobile network device is capable of operating while traveling.

25. The method as recited in claim 23, wherein the one or more operating characteristics include at least one of bandwidth, quality of service method, or percentage or fraction of the bandwidth allocated to one or more types of traffic.

26. The method as recited in claim 25, wherein the one or more types of traffic include voice traffic.

27. The method as recited in claim 23, further comprising: modifying one or more of the values of one or more of the operating characteristics of one or more of the interfaces of the mobile network device that are present at one or more speeds of the mobile network device.

28. The method as recited in claim 23, wherein configuring comprises:

setting the values of the operating characteristics of one of the interfaces of the mobile network device such that the values correspond to operating characteristics of a device to which the interface of the mobile network device is connected.

29. A computer-readable medium storing thereon computer-readable instructions for operating a mobile network device, comprising:
- instructions for detecting a speed of the mobile network device;
- instructions for ascertaining one or more values of one or more operating characteristics of each of two or more interfaces of the mobile network device, the one or more values of the one or more operating characteristics of each of the two or more interfaces corresponding to the speed of the mobile network device; and
- instructions for selecting one of the two or more interfaces using the values of the one or more operating characteristics of each of the two or more interfaces at the speed of the mobile network device, the selected one of the two or more interfaces having a desired set of values of the operating characteristics at the speed of the mobile network device.

30. An apparatus for operating a mobile network device, comprising:
- means for detecting a speed of the mobile network device;
- means for ascertaining one or more values of one or more operating characteristics of each of two or more interfaces of the mobile network device, the one or more values of the one or more operating characteristics of each of the two or more interfaces corresponding to the speed of the mobile network device; and
- means for selecting one of the two or more interfaces using the values of the one or more operating characteristics of each of the two or more interfaces at the speed of the mobile network device, the selected one of the two or more interfaces having a desired set of values of the operating characteristics at the speed of the mobile network device.

31. An apparatus for operating a mobile network device, comprising:
- a processor; and
- a memory, at least one of the processor or the memory being adapted for:
- detecting a speed of the mobile network device;
- ascertaining one or more values of one or more operating characteristics of each of two or more interfaces of the mobile network device, the one or more values of the one or more operating characteristics of each of the two or more interfaces corresponding to the speed of the mobile network device; and
- selecting one of the two or more interfaces using the values of the one or more operating characteristics of each of the two or more interfaces at the speed of the mobile network device, the selected one of the two or more interfaces having a desired set of values of the operating characteristics at the speed of the mobile network device.

* * * * *